(12) United States Patent
Leiber et al.

(10) Patent No.: US 6,386,458 B1
(45) Date of Patent: May 14, 2002

(54) OPTICAL DATA STORAGE

(75) Inventors: Jörn Leiber, Hamburg; Steffen Noehte, Weinheim; Matthias Gerspach, Heidelberg, all of (DE)

(73) Assignee: Beiersdorf AG, Hamburg (DE)

(*) Notice: Subject to any disclaimer, the term of this patent is extended or adjusted under 35 U.S.C. 154(b) by 0 days.

(21) Appl. No.: 09/787,099

(22) PCT Filed: Mar. 17, 1999

(86) PCT No.: PCT/EP99/01852

§ 371 Date: May 9, 2001

§ 102(e) Date: May 9, 2001

(87) PCT Pub. No.: WO00/17864

PCT Pub. Date: Mar. 30, 2000

(30) Foreign Application Priority Data

Sep. 19, 1998 (DE) ................................ 298 16 802 U

(51) Int. Cl.[7] .................................................. G06K 19/00
(52) U.S. Cl. ...................... 235/487; 235/449; 235/454
(58) Field of Search ................................ 235/449, 487, 235/454

(56) References Cited

U.S. PATENT DOCUMENTS 5,109,374 A * 4/1992 Tsunoda et al.
5,311,499 A * 5/1994 Hwang

FOREIGN PATENT DOCUMENTS

| DE | 41 06137 A1 | 9/1991 |
|----|----|----|
| EP | 0 352 194 | 1/1990 |
| EP | 0 514 589 A2 | 11/1992 |
| EP | 0 514 589 | 11/1992 |
| JP | 55080832 | 6/1980 |
| JP | 61099981 | 5/1986 |
| JP | 09063122 | 3/1997 |
| JP | 10031844 | 2/1998 |

OTHER PUBLICATIONS

Patent Abstracts of Japan vol. 004, No. 127 (P–026), Sep. 1980 & JP55 080832 A (Oki Electric Ind Co Ltd), Jun. 1980.
Patent Abstracts of Japan vol. 097, No. 007, Jul. 1997 & JP09 063122 A (Hitachi Ltd), Mar. 1997.
Patent Abstracts of Japan vol. 098, No. 006, Apr. 1998 & JP10 031844 (Hitachi Ltd), Feb. 1998.
Patent Abstracts of Japan vol. 010, No. 278 (P–499), Sep. 1986 & JP61 099981 A (Hitachi Ltd), May 1986.

* cited by examiner

Primary Examiner—Harold I. Pitts
(74) Attorney, Agent, or Firm—Nixon & Vanderhye

(57) ABSTRACT

A data storage medium (1) comprises an information carrier which is wound in a spiral fashion and on which information units are provided which can be read optically. The information carrier is optically transparent.

17 Claims, 1 Drawing Sheet

OPTICAL DATA STORAGE

The present invention relates to an optical data storage medium.

BACKGROUND OF THE INVENTION

Optical data storage media are known. For instance, flat round data carriers in the form of CD-ROMs, audio CDs, etc., are on the market. Also known are flat round data carriers such as DVDs, in which two layers containing optical information are arranged above one another and may be read selectively.

U.S. Pat. No. 5,109,374 also discloses an optical data storage medium, but discloses only the arrangement of a data carrier in one layer on a cylinder.

OBJECTS OF THE INVENTION

The object of the invention is to provide an optical data storage medium which has a high capacity for accommodating data, which is easy to write to and read from again, which ensures that the data present on it can be stored for a long time, and which is simple in construction and inexpensive to produce.

This object is achieved by means of a data storage medium as described in the main claim. The subclaims relate to preferred embodiments of the data storage medium.

SUMMARY OF THE INVENTION

The invention accordingly provides a data storage medium comprising an information carrier which is wound in a spiral fashion and on which information units are provided which can be read optically. The information carrier is optically transparent. Governed by the winding of the information carrier, the data storage medium of the invention has a substantially round form (preferably a roll).

In a first advantageous embodiment of the data storage medium of the invention, the information units can be read through a plurality of information carrier layers; in particular, the data storage medium can be read in the wound state, i.e., through a plurality of wound layers—this is achieved by choosing a highly transparent information carrier.

The inventive choice of the information carrier and also the introduction and/or application of the information units result in a data carrier which constitutes a highly compact storage medium. Although clearly defined wound layers can be written to and read from, a storage medium is obtained which allows volume storage. Accordingly, the disadvantages of the known flat data storage media are avoided by virtue of the spiral-type winding. Furthermore, in contest, for instance, of a CD, it is unnecessary to provide a very large surface area.

The transparent wound body formed from the layers of the wound information carrier preferably comprises at least 10 layers and preferably has a diameter of from about 20 to 50 mm. The height of the wound cylinder may be, for example, around 19 mm. The number of winds may be, for example, between 10 and 30, although larger numbers may very well be realized.

The data storage medium may comprise an information carrier made from transparent polymer film, the use of PMMA (polymethyl methacrylate) or BOPP (biaxially oriented polypropylene) being a particular possibility.

If the data storage medium has a transparent adhesion agent between the polymer film layers, in particular a pressure sensitive adhesive, the effect is both to minimize interfacial reflections and to prevent unwanted unwinding. The adhesion film has—like the polymer film, preferably been freed from bubbles. In order to improve the optical transparency, it is desirable for the refractive index possessed by the adhesion agent to differ little from the refractive index of the information carrier. For instance, the difference in the refractive indices of information carrier and adhesion agent may be so little that the reflection at the boundary is less than 2%, preferably less than 0.1%. With particular preference, the difference in the refractive indices is less than 0.005. In that case, information units can be read effectively through more than twenty wound layers, without the need to give the information carrier film an antireflection coating.

If the polymer film has a thickness of between 10 and 100 $\mu$m, preferably around or below 50 $\mu$m, with particular preference around 35 $\mu$m, this ensures that the data on different wound layers are separate from one another which permits good resolution without the need for excessive volumes.

At the same time, the adhesion agent may also have a layer thickness of between 1 and 40 $\mu$m, preferably below 25 $\mu$m, in particular around 2 $\mu$m. If the adhesion agent is also provided with an absorber for writing light, i.e., if it absorbs the energy required to write to the information units and transfers it to the polymer film for thermal structuring of the latter, a sufficiently large effect may be achieved by the stated layer thickness. The thickness is ideal for typical extents of focus in the material.

The data storage medium may have an optically transparent winding core, which is constructed in particular as a transparent hollow cylinder, Accordingly, the data storage medium becomes readable from the inside, which enables the optical system for writing and/or reading and/or rewriting to be arranged—in particular, in rotation—in the inside of the winding. Such an arrangement simplifies the production of the data storage medium insofar as it is necessary to balance out only the optical system, and not each individual data carrier. For balancing the reading optical system, there are preferably two diametrally opposing lens arrangements provided, between which, for instance, a central beam splitter unit for inward and outward irradiation of the light may be provided. These lenses may rotate together with the beam splitter. The first of these lenses may be envisaged for outer wound layers, the second for the inner wound units, thereby increasing the access speeds by reducing the extent of refocusing necessary.

The data storage medium is preferably preformatted with formatting formed by and/or by means of the spiral layers. Formatting may also be introduced during or prior to winding in or on the information carrier during production, for example, by hot embossing and so on.

With particular preference, the data storage medium comprises an information carrier possessing a high intrinsic energy stored in the material: for example, a polymer film which is pretensioned, especially in two planes. This is particularly advantageous insofar as it is then possible to obtain a large change in material through reformation by depositing only a small quantity of energy, so that weak optical beams are sufficient for very large changes in material which are easy to read.

It is possible for the information units, or some of them, to be formed by local thermal heating of the information carrier. In the case of a pretensioned polymer film, the thermal heating changes the optical path length in the material and/or the refractive index or the reflectivity. This change is readily detectable from the backreflection intensity of an inwardly irradiated beam of light emitted, in particular, from a conventional semiconductor laser.

Preferably, at the site of thermal heating, the pretensioned information carrier has a locally changed optical density, in particular with a change in refractive index of about 0.2. It is further preferred for the information units to be formed by changing the optical properties in a region of less than 1 μm in diameter. This is readily possible with commercial semiconductor diodes and optical systems.

The information units may store data in binary form; a further possibility is that of storage in a plurality of gray stages. This is possible if the polymer film may be specifically altered in a defined manner without saturation, as is possible in the case of commercially customary BOPP polymer film with adhesion layers in between, when using, for example, the adhesive tape roll "tesafilm kristallklar"®.

The information units are preferably designed in such a way that, at least at some points, no saturation of the information carrier change has taken place, and the information units are able to adopt more than two different states.

With particular advantage, the data storage medium may be used in a data drive for a data carrier in which a relative movement takes place between information units and reading head, with the data carrier generally being stationary and/or the reading head, especially in the central region of the wound body, rotating and moving back and forth axially in order to find a predetermined track.

BRIEF DESCRIPTION OF THE DRAWING

The present invention is described below by means of an example, with reference to a drawing, without wishing to restrict the invention unnecessarily. In this drawing.

DESCRIPTION OF THE PREFERRED EMBODIMENT

Figure 1:
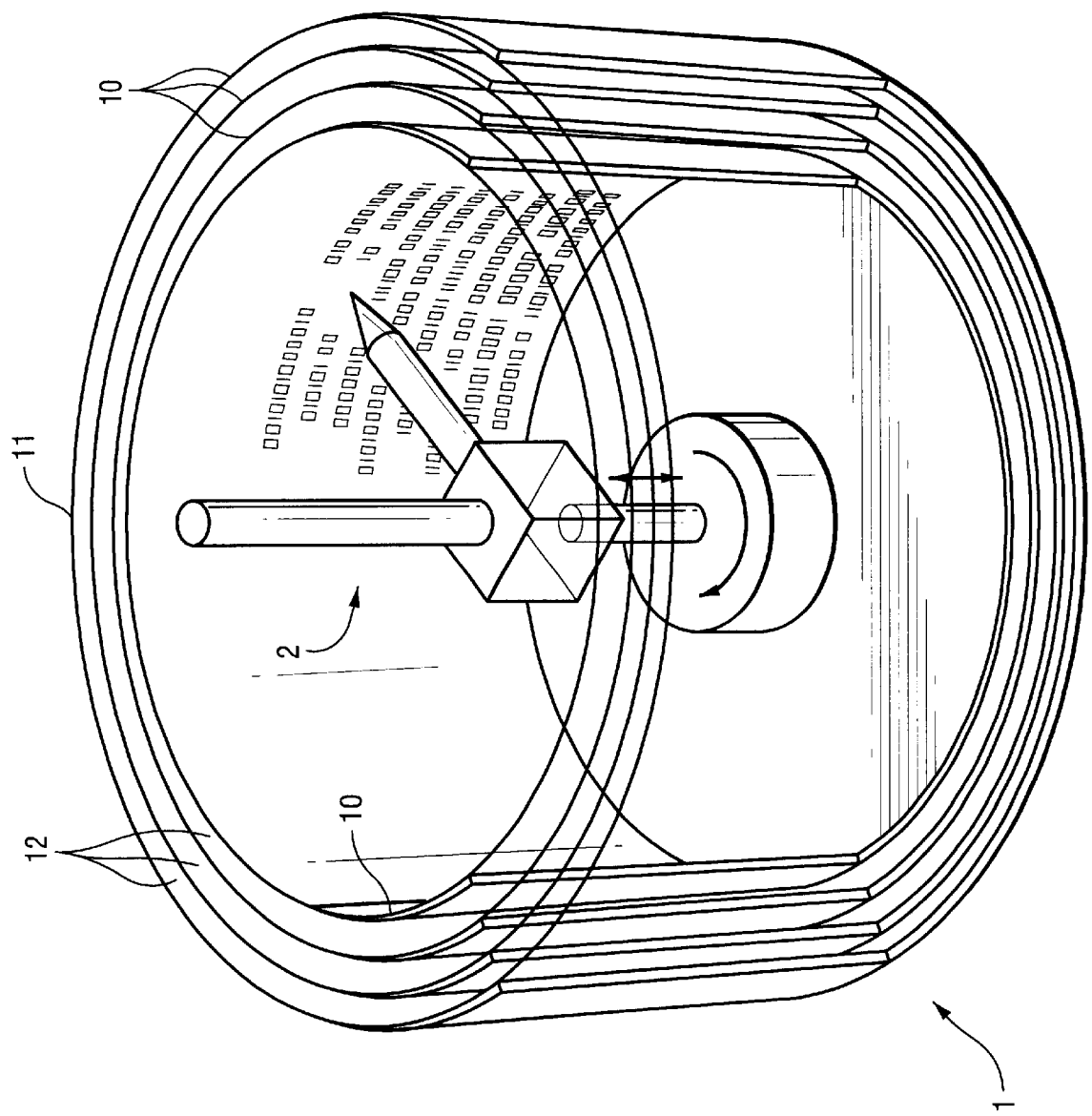
FIG. 1 shows a data storage medium of the present invention in a schematic perspective representation.

According to the FIGURE, the data storage medium 1 comprises a number of wound layers 10 of polymer film 11, which has been pretensioned in both directions prior to winding. The polymer film 11 consists of BOPP and has a thickness of 35 μm. Arranged between the layers 10 is an adhesion agent 12 (acrylic dispersion adhesive), free from air bubbles and having a thickness of 23 μm. The transparent wound body (data storage medium 1) comprises twenty layers 10 and has a diameter of about 30 mm. The height of the wound cylinder is 19 mm. The wound body is available commercially from the company Beiersdorf under the designation "tesafilm kristallklar"®.

Arranged in the interior of the wound core carrier is an optical system 2, with which a beam of light of wavelength 630 nm or 532 nm, for example, is focused onto the individual wound layers 10. Furthermore, the optical system 2 may be moved back and forth axially. The optical system 2 is designed so that, on the one hand, energy can be deposited and, on the other hand, the light intensity reflected at a selectable point of a desired wound layer 10 can be determined. In order to be able to address all possible points of a wound layer 10, the optical system 2 rotates in the interior of the wound body, with a balancing system (not shown in detail) permitting high speeds of rotation. A servo control allows focusing onto different wound layers 10.

Using this system, data are stored and read as follows:

First of all, with an power of 1 mW focused on a spot of less than 1 μm (one micrometer), a certain quantity of energy is deposited in the polymer film, the deposition of the energy taking place directly in the polymer film or indirectly by heating of the adhesion agent. This deposited energy alters the optical properties of the polymer film, which undergoes deformation from the pretensioned state.

Subsequently, the change in optical properties may be read out by measuring the reflection intensity using the same laser and reduced inward irradiation power.

A data storage medium constructed in this way is compact, is inexpensive with regard to the data carriers and permits a storage density of at least 10 gigabytes per roll. Higher storage densities result if the choices of film thickness and of material are improved.

It is possible to record formatting information and/or other desired information on the data storage medium prior to winding.

What is claimed is:

1. A data storage medium comprising an information carrier which is wound in a spiral fashion and on which information units are provided which can be read optically, the information carrier being optically transparent and the information units being readable through a plurality of information carrier layers (10), wherein the data storage medium is adapted to be read in the wound state.

2. The data storage medium as claimed in claim 1, wherein the information carrier is a transparent polymer film (11).

3. The data storage medium as claimed in claim 2, wherein PMMA or BOPP is used as polymer film (11).

4. The data storage medium as claimed in claim 2, wherein between the polymer film layers (10) a transparent adhesion agent (12) is used, in particular a pressure sensitive adhesive.

5. The data storage medium as claimed in claim 4, wherein the adhesion agent (12) possesses a refractive index which differs little from the refractive index of the information carrier.

6. The data storage medium as claimed in claim 5, wherein the difference in the refractive indices of information carrier and adhesion agent (12) is so little that the reflection at the boundary is less than 4%, preferably less than 1%, and, with very particular preference, such that the difference in the refractive indices is less than 0.005.

7. The data storage medium as claimed in claim 2, wherein the polymer film (11) has a thickness of between 10 and 100 μm, preferably around or below 50 μm, with particular preference around 35 μm.

8. The data storage medium as claimed in claim 4, wherein the adhesion agent (12) has a film thickness of between 1 and 40 μm, preferably below 25 μm, in particular around 2 μm.

9. The data storage medium as claimed in claim 1, wherein the data storage medium has an optically transparent winding core which is formed in particular as a transparent hollow cylinder.

10. The data storage medium as claimed in claim 1, wherein the data storage medium is preformatted, the formatting being formed by and/or by means of the spiral layers (10).

11. The data storage medium, in particular as claimed in claim 1, wherein the optical data storage medium comprises as information carrier a transparent polymer film (11) which is pretensioned, especially in two planes.

12. The data storage medium as claimed in claim 1, wherein the information units, or some of them, can be produced by local thermal heating of the information carrier.

13. The data storage medium as claimed in claim 12, wherein, at the location of the thermal heating, the pretensioned information carrier has a locally changed optical density, in particular with a change in refractive index of about 0.2.

14. The data storage medium as claimed in claim 1, wherein the information units are formed by changing the optical properties in a region of less than 1 µm in diameter.

15. The data storage medium as claimed in claim 1, wherein the information units are designed for the storage of one of two states.

16. The data storage medium as claimed in claim 1, wherein the information units are designed in such a way that, at least at some points, no saturation of the information carrier change has taken place, and the information units are able to adopt more than two different states.

17. The use of a data storage medium in a data drive for a data carrier, as set forth in claim 1, in which a relative movement takes place between information units and reading head (2), with the data carrier generally being stationary and/or the reading head (2), especially in the central region of the wound body, rotating.

* * * * *